(12) United States Patent
Ogawa

(10) Patent No.: US 9,422,001 B2
(45) Date of Patent: Aug. 23, 2016

(54) LANE LINE DEPARTURE PREVENTION APPARATUS

(71) Applicant: DENSO CORPORATION, Kariya, Aichi-pref. (JP)

(72) Inventor: Keiko Ogawa, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/768,686

(22) PCT Filed: Feb. 6, 2014

(86) PCT No.: PCT/JP2014/052753
§ 371 (c)(1),
(2) Date: Aug. 18, 2015

(87) PCT Pub. No.: WO2014/129312
PCT Pub. Date: Aug. 28, 2014

(65) Prior Publication Data
US 2015/0375784 A1    Dec. 31, 2015

(30) Foreign Application Priority Data
Feb. 19, 2013    (JP) .................................. 2013-029997

(51) Int. Cl.
*B62D 15/02*    (2006.01)
*G08G 1/16*    (2006.01)
(Continued)

(52) U.S. Cl.
CPC ................ *B62D 15/025* (2013.01); *B60Q 9/00* (2013.01); *B60R 1/00* (2013.01); *G06T 7/0085* (2013.01); *G08G 1/167* (2013.01); *B60R 2300/10* (2013.01); *B60R 2300/804* (2013.01)

(58) Field of Classification Search
CPC .......... B60Q 9/00; B62D 15/025; B60R 1/00; B60R 2300/10; B60R 2300/804; G06T 7/0085; G08G 1/167

USPC ........................................................... 701/41
See application file for complete search history.

(56) References Cited

U.S. PATENT DOCUMENTS

| 2008/0024284 A1* | 1/2008 | Baratoff ................. G08G 1/161 340/435 |
| 2009/0034799 A1 | 2/2009 | Nishida et al. |

(Continued)

FOREIGN PATENT DOCUMENTS

| JP | 2002-099904 A | 4/2002 |
| JP | 2003-168198 A | 6/2003 |

(Continued)

OTHER PUBLICATIONS

International Search Report (translated version); International Application No. PCT/JP2014/052753, filed Feb. 6, 2014; 9 pages.

(Continued)

*Primary Examiner* — McDieunel Marc
*Assistant Examiner* — James E Stroud
(74) *Attorney, Agent, or Firm* — Knobbe, Martens, Olson & Bear, LLP

(57) ABSTRACT

A travel lane line determining unit determines a travel lane line to be used based on a predetermined selection criterion, from among the travel lane lines. A determining unit determines whether or not the own vehicle is going to depart from the travel lane line based on the determined travel lane line. A departure preventing unit outputs an alarm or controls steering of the own vehicle towards a direction in which the departure is avoided, when determined that the own vehicle is going to depart from the travel lane line. A parallel-driving control unit controls steering of the own vehicle such that the own vehicle travels along the determined travel lane line. The selection criterion determines a travel lane line from the travel lane lines which do not correspond to a predetermined exclusion condition, according to an execution state of the departure preventing unit or the parallel-driving control unit.

6 Claims, 5 Drawing Sheets

(51) Int. Cl.
B60R 1/00 (2006.01)
B60Q 9/00 (2006.01)
G06T 7/00 (2006.01)

(56) References Cited

U.S. PATENT DOCUMENTS

| | | | | |
|---|---|---|---|---|
| 2009/0058622 | A1* | 3/2009 | Hsieh | B60Q 9/008 340/435 |
| 2010/0002911 | A1* | 1/2010 | Wu | G06K 9/00798 382/104 |
| 2010/0265325 | A1* | 10/2010 | Lo | B62D 15/029 348/119 |
| 2011/0103650 | A1* | 5/2011 | Cheng | B60R 1/00 382/104 |
| 2011/0205363 | A1 | 8/2011 | Suzuki | |
| 2011/0216938 | A1* | 9/2011 | Suzuki | G06K 9/00 382/103 |
| 2012/0050074 | A1* | 3/2012 | Bechtel | B60R 1/04 340/988 |
| 2012/0177250 | A1 | 7/2012 | Nakano et al. | |
| 2016/0036558 | A1* | 2/2016 | Ibrahim | H04K 3/92 455/297 |
| 2016/0129938 | A1* | 5/2016 | Okuda | B62D 15/025 701/41 |

FOREIGN PATENT DOCUMENTS

| | | |
|---|---|---|
| JP | 2003-331294 A | 11/2003 |
| JP | 2005-329765 A | 12/2005 |
| JP | 2007-257449 A | 10/2007 |
| JP | 2010-009361 A | 1/2010 |
| JP | 2010-146470 A | 7/2010 |
| JP | 2010-180982 A | 8/2010 |
| JP | 2010-205175 A | 9/2010 |
| JP | 2011-043907 A | 3/2011 |
| JP | 2011-159147 A | 8/2011 |
| JP | 2011-175468 A | 9/2011 |
| JP | 2012-146135 A | 8/2012 |
| WO | 2014/129312 A1 | 8/2014 |

OTHER PUBLICATIONS

International Preliminary Report on Patentability; International Application No. PCT/JP2014/052753; Filed: Feb. 6, 2014 (with English translation).

* cited by examiner

FIG.5
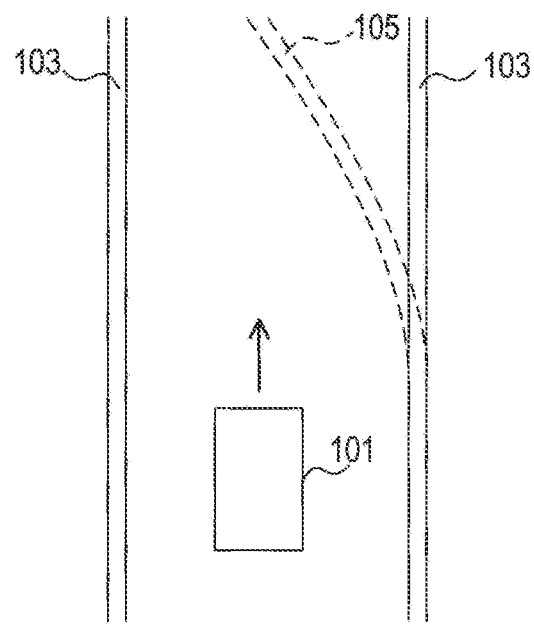
(1)
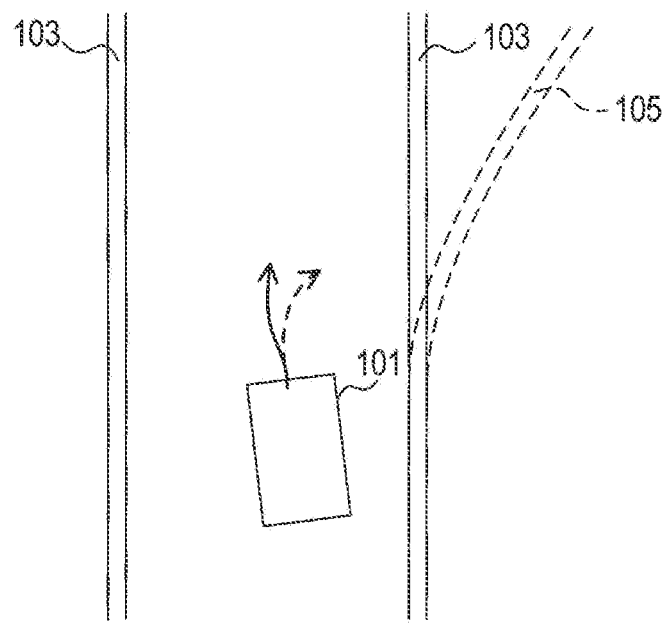
(2)

LANE LINE DEPARTURE PREVENTION APPARATUS

CROSS-REFERENCE TO RELATED APPLICATION

This application is a U.S. National Phase Application under 35 U.S.C. 371 of International Application No. PCT/JP2014/052753 filed on Feb. 6, 2014 and published in Japanese as WO 2014/129312 A1 on Aug. 28, 2014. This application is based on and claims the benefit of priority from Japanese Patent Application No. 2013-029997, filed Feb. 19, 2013. The entire disclosures of all of the above applications are incorporated herein by reference.

TECHNICAL FIELD

The present invention relates to a lane line (lane marking) departure prevention apparatus. In particular, the present invention relates to an apparatus which is mounted to a vehicle, such as an automobile, to prevent the vehicle from departing from a travel lane.

BACKGROUND ART

Apparatuses that perform a departure prevention process for vehicles are well known. In such a departure prevention process, a road surface image is acquired by an in-vehicle camera mounted to the vehicle (own vehicle) and the image is subjected to an image recognition process to detect a travel lane line on which the own vehicle travels. Then, based on the detected travel lane line, and the speed and yaw rate of the own vehicle, a driving determination process is performed, followed by performing the departure prevention process for the own vehicle according to the determination results (refer to PTL 1). In the departure prevention process, when it is determined, as a result of the driving determination process, that the own vehicle has a high probability of departing from a travel lane, an alarm is issued by sounding a buzzer, displaying an image, or the like, or the own vehicle is steered in a direction of preventing departure from the travel lane.

CITATION LIST

Patent Literature

[PTL 1] JP-A-2010-009361

SUMMARY OF THE INVENTION

Technical Problem

Depending on the environment around the own vehicle, the travel lane line may be erroneously recognized, being influenced by the noise of the road surface, and the like. When the above departure prevention process is performed based on an erroneously recognized travel lane line, there is a concern of unavoidably causing unnecessary alarm or excessive steering.

The present invention has been made in light of the foregoing problems and has an object of providing a lane line departure prevention apparatus that can solve the problems.

Solution to Problem

A lane line departure prevention apparatus according to an embodiment of the present invention includes image acquiring means, edge extracting means, lane line detecting means, travel lane line estimating means, travel lane line determining means, determining means, departure preventing means, and parallel-driving control means. The image acquiring means images an image of a road surface ahead of an own vehicle and acquires a road surface image. The edge point extracting means extracts edge points from the road surface image acquired by the image acquiring means. The lane line detecting means detects a lane line on the basis of the edge points extracted by the edge point extracting means. The travel lane line estimating means estimates a plurality of travel lane lines from an edge of the lane line. The travel lane line determining means determines a travel lane line to be used based on a selection criterion set in advance, from among the plurality of travel lane lines. The selection criterion determines a travel lane line from the plurality of travel lane lines which do not correspond to an exclusion condition set in advance, according to an execution state of the departure preventing means or the parallel-driving control means does not apply. The determining means determines whether or not the own vehicle is going to depart from the travel lane line on the basis of the travel lane line determined by the travel lane line determining means. The departure preventing means outputs an alarm or controls steering of the own vehicle towards a direction in which the departure is avoided, when the determining means determines that the own vehicle is going to depart from the travel lane line. The parallel-driving control means controls steering of the own vehicle such that the own vehicle travels along the travel lane line determined by the travel lane line determining means.

According to an embodiment of the present invention, this configuration can prevent departure of the own vehicle from the travel lane line.

A lane line departure prevention apparatus according to an embodiment of the present invention determines a travel lane line to be used from among travel lane lines which do not correspond to a predetermined exclusion condition that is determined according to the execution state of the departure preventing means or the parallel-driving control means.

According to an embodiment of the present invention, this configuration can prevent unnecessary execution of the departure preventing means and the parallel-driving control means, or sudden steering by the parallel-driving control means.

BRIEF DESCRIPTION OF DRAWINGS

In the accompanying drawings:

FIG. 5 illustrates, by (1), an explanatory diagram of a state where a travel lane line is detected on the inside relative to an actual travel lane line and, by (2), an explanatory diagram of a state where a travel lane line is detected on the outside relative to an actual travel lane line.

DESCRIPTION OF EMBODIMENTS

Embodiments of the present invention will hereinafter be described with reference to the drawings.

First Embodiment

1. Configuration of a Lane Line Departure Prevention Apparatus 1

First, with reference to FIG. 1, a configuration of a lane line (lane marking) departure prevention apparatus (referred to, hereafter, as simply a "departure prevention apparatus") according to a first embodiment will be described.

Figure 1:
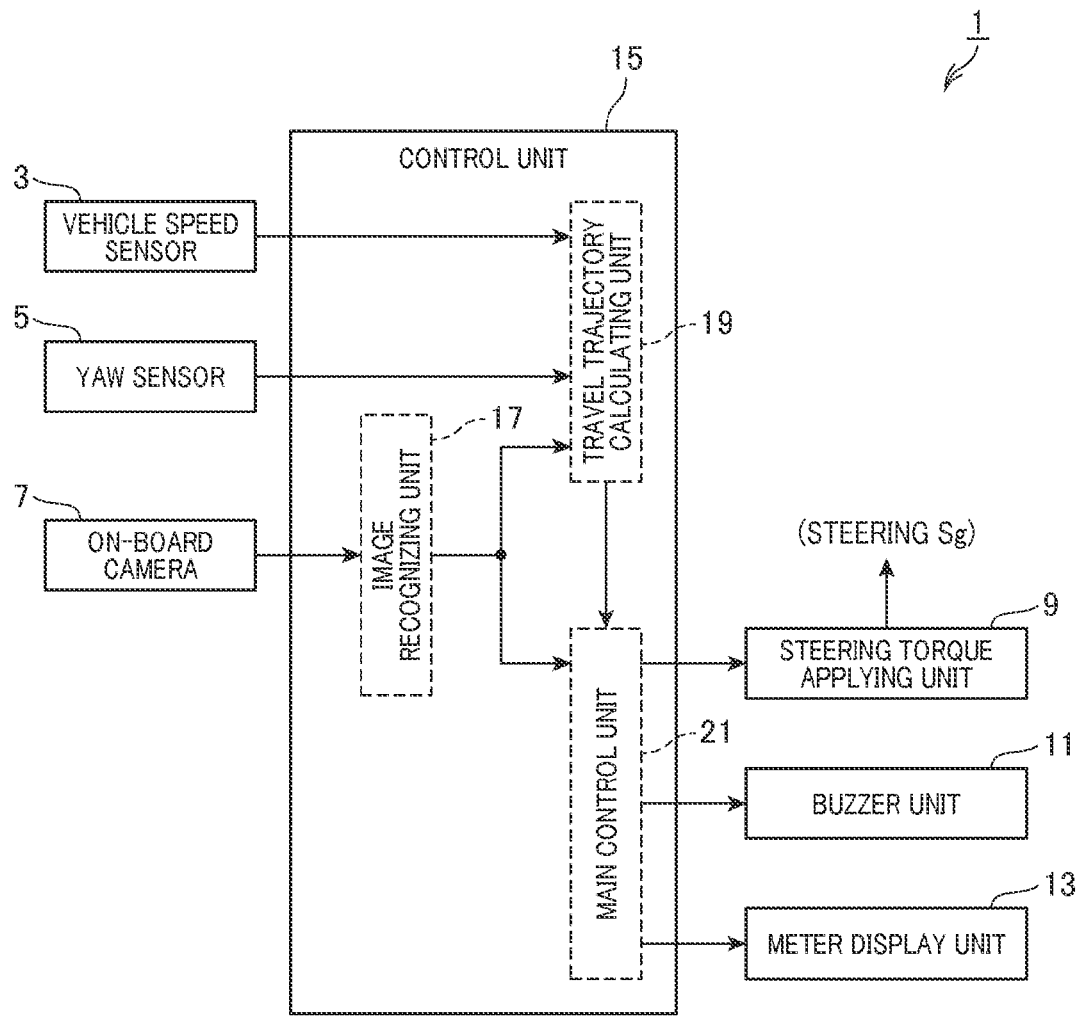
FIG. 1 is a block diagram illustrating a configuration of a lane line departure prevention apparatus according to a first embodiment of the present invention.

As shown in FIG. 1, a departure prevention apparatus 1 according to the present embodiment is mounted to a vehicle such as an automobile (referred to, hereafter, as own vehicle), and includes a vehicle speed sensor 3, a yaw sensor 5, and an in-vehicle camera (imaging unit) 7. The vehicle speed sensor 3 detects the travel speed (vehicle speed) of the own vehicle. The yaw sensor 5 detects the angular velocity (i.e. yaw rate) in a turning direction of the own vehicle. The in-vehicle camera 7 is mounted, for example, on the front center side of the own vehicle to acquire an image of a landscape including the road surface ahead of the own vehicle and outputs the road surface image data.

In addition, as shown in FIG. 1, the departure prevention apparatus 1 includes a steering torque applying unit 9, a buzzer unit 11, a meter display unit 13, and a control unit 15. The steering torque applying unit 9 applies steering torque to a steering Sg of the own vehicle, in a direction opposite to a departure direction (the direction of coming closer to the travel lane line from which the own vehicle is about to depart). The buzzer unit 11 generates an alarm buzzer. The meter display unit 13 lights and displays an alarm lamp on a meter. The control unit performs various processes on the basis of the inputs from the vehicle speed sensor 3, the yaw sensor 5, and the in-vehicle camera 7, and controls the steering torque applying unit 9, the buzzer unit 11, and the meter display unit 13.

As shown in FIG. 1, the control unit 15 includes an image recognizing unit 17 and a travel trajectory calculating unit 19. The image recognizing unit 17 extracts edge points by applying an image recognition process at steps 12 and 13, described hereafter, to the road surface image data inputted from the in-vehicle camera 7, and determines a travel lane on the basis of the extracted edge points. The travel trajectory calculating unit 19 calculates a travel trajectory of the own vehicle in the case where the own vehicle travels on a travel lane with the vehicle speed and yaw rate being unchanged, based on the detection results derived from the vehicle speed sensor 3 and the yaw sensor 5, and road parameters described hereafter.

Further, as shown in FIG. 1, the control unit 15 has a main control unit 21. The main control unit 21 performs a lane line departure prevention process (referred to, hereafter, as departure prevention process) and a parallel-driving control process on the basis of the travel lane line determined by the image recognizing unit 17 and the travel trajectory (referred to, hereafter, as predicted travel trajectory) calculated by the travel trajectory calculating unit 19.

The image recognizing unit 17, the travel trajectory calculating unit 19, and the main control unit 21 are all realized as processes performed by a known microcomputer that includes a CPU (central processing unit), a ROM (read-only memory), a RAM (random access memory), an EEPROM (electrically erasable programmable read-only memory), a DSP (digital signal processor), and the like.

Of these, the image recognizing unit 17 performs a travel lane line determination process to determine a travel lane line on a travel road, using a known image recognition process method, such as edge extraction or pattern detection. The image recognizing unit 17 also specifies a curvature radius R, a lane width W, types of travel lane lines, and the like, of the travel lane.

Types of travel lane lines herein are classified into broken white lines, solid white lines, solid yellow lines, composite lines each composed of a plurality of broken lines or solid lines (referred to, hereafter, as simply "composite line(s)"), temporary median strips (referred to, hereafter, as "temporary common area(s)") each formed by setting up center poles (e.g., small post-shaped cones) between a plurality of solid yellow lines on a road center line (that is, a center line), curbs, and the like.

The travel trajectory calculating unit 19 performs a coordinate calculation process in which the position coordinates of the own vehicle on the predicted travel trajectory are calculated, for example, as follows.

Specifically, the vehicle speed inputted from the vehicle speed sensor 3 is represented by V [m/sec], the yaw rate inputted from the yaw sensor 5 is represented by ω[rad/sec], the advancing direction of the own vehicle at the current position is represented by the Y direction, and the vehicle width direction is represented by the X direction. In this case, the own vehicle advances at 0.1 V per 0.1 seconds, during which a rotation angle (advancing direction angle of the vehicle relative to a travel lane) increases on a 0.1ω-basis. Therefore, for example, the vehicle position (X(T), Y(T)) after T seconds when the current position of the own vehicle is the point of origin can be determined by the following expression (refer to JP-A-2004-038487 for details).

$$X(T)=0.1V\{\sin 0.1\omega+\sin 0.2\omega+\ldots+\sin(T-0.1)\omega\}$$

$$Y(T)=0.1V\{1+\cos 0.1\omega+\cos 0.2\omega+\ldots+\cos(T-0.1)\omega\}$$

In the coordinate calculation process, the calculation method is not limited to the foregoing. The time interval may be shorter than 0.1 seconds, and the vehicle position (X(T), Y(T)) after T seconds may be calculated using an approximation, or the like, taking the yaw rate ω as being a sufficiently small value.

2. Process Performed by the Departure Prevention Apparatus 1

Figure 3:
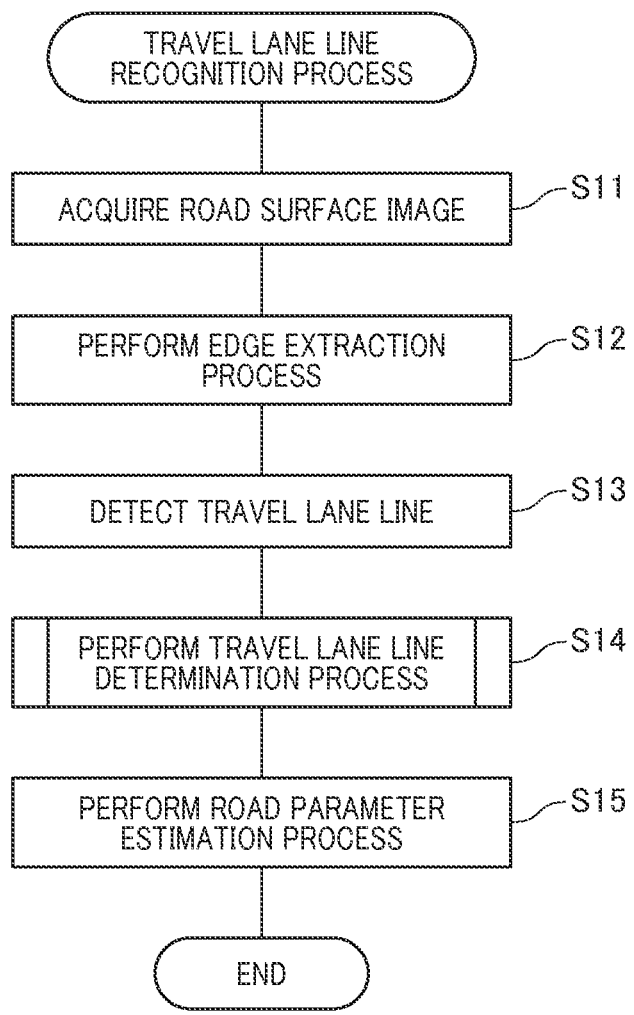
FIG. 3 is a flowchart illustrating a travel lane line recognition process performed by the lane line departure prevention apparatus illustrated in FIG. 1.
Figure 4:
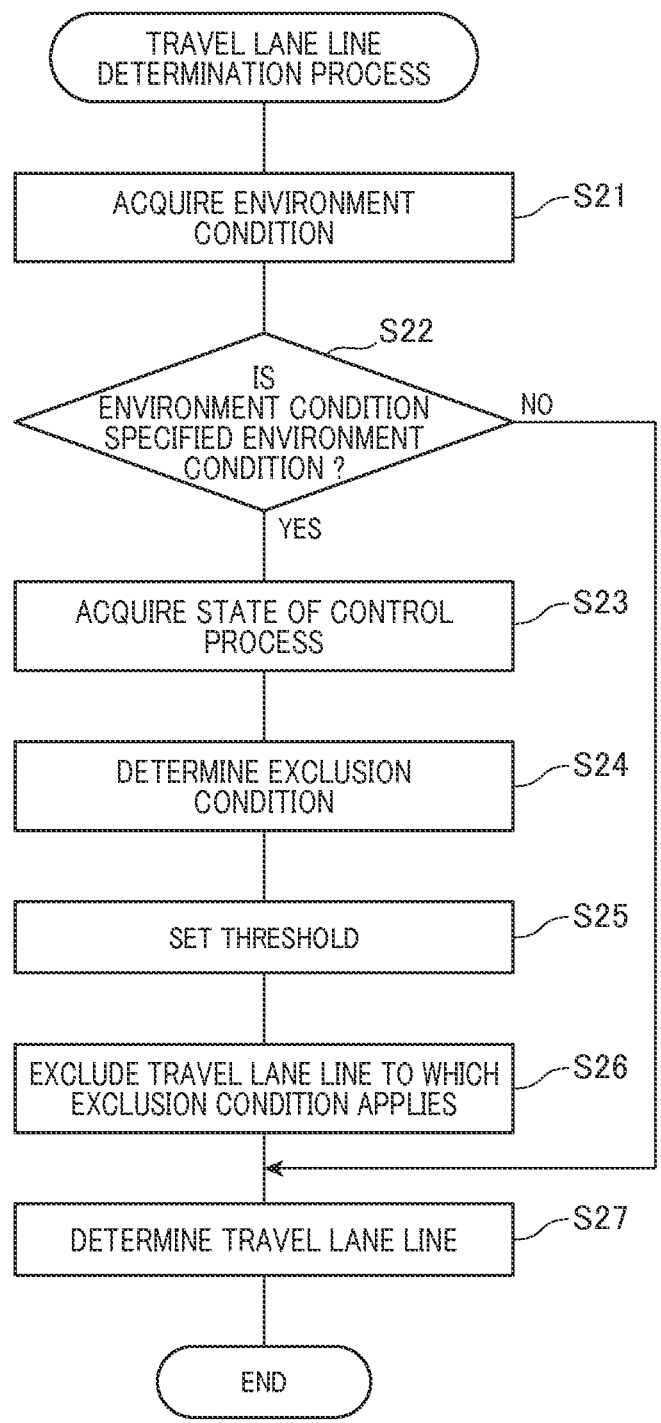
FIG. 4 is a flowchart illustrating a travel lane line determination process performed by the lane line departure prevention apparatus illustrated in FIG. 1.

With reference to the flowcharts shown in FIGS. 2 to 4, hereinafter is described a travel lane line departure prevention process which is repeatedly performed on a predetermined-period basis by the departure prevention apparatus 1 while the own vehicle is traveling.

Figure 2:
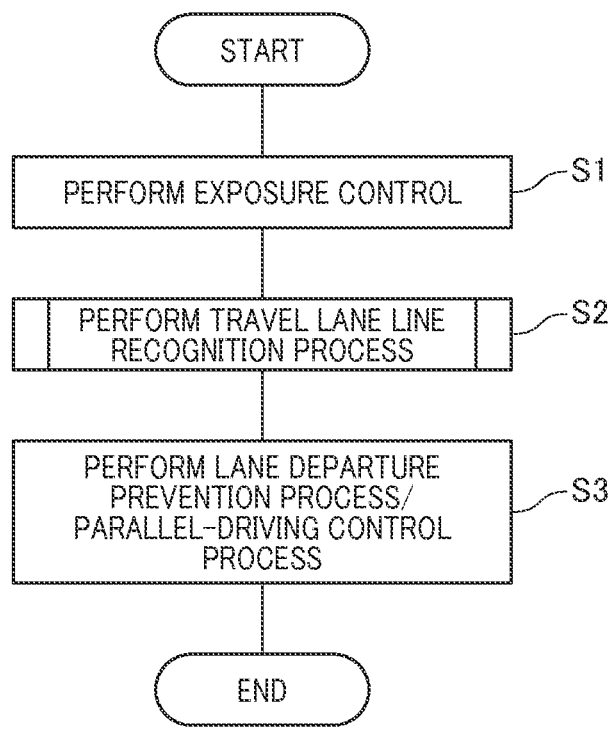
FIG. 2 is a flowchart illustrating overall processing performed by the lane line departure prevention apparatus illustrated in FIG. 1.

At step S1 of FIG. 2, the exposure of the in-vehicle camera 7 is adjusted to a value suitable for acquiring an image of the road surface ahead of the own vehicle. A known method can be used for the exposure adjustment.

At step S2, the departure prevention apparatus 1 recognizes a travel lane line (lane marking) that defines a travel lane on which the own vehicle is traveling. The details will be described hereafter.

At step S3, it is determined whether or not the own vehicle is going to depart from the travel lane line on the basis of the travel lane line recognized at step S2 (the travel lane line determined at step S27, described hereafter). If it is determined that the own vehicle is going to depart the travel lane line, the departure prevention process is performed. In the departure prevention process, a sound (lane departure alarm) is produced by the buzzer unit 11 and steering is controlled to direct the vehicle in a direction of avoiding lane departure.

The determination as to whether or not the own vehicle is going to depart from the travel lane line is made as follows. Specifically, the departure prevention apparatus 1 obtains a predicted time Te taken for the position coordinates of the own vehicle (specifically, the position of the front wheel of the own vehicle) to reach the travel lane line recognized at step 2, the position coordinates being on the predicted travel trajectory calculated as described above. If Te is less than a predetermined threshold X1, it is determined that the own vehicle is going to depart from the travel lane line. If Te is not less than X1, it is determined that the own vehicle is not going to depart from the travel lane line.

The departure prevention apparatus 1 performs a parallel-driving control process in which the own vehicle is steered so as to travel along (in parallel with) a travel lane line. In the parallel-driving control process, the steering torque applying unit 9 steers the own vehicle such that the advancing direction of the own vehicle is parallel with the travel lane line, and prevents departure from the lane. For example, when the own vehicle is gradually moving away from the travel lane line, the steering torque applying unit 9 performs steering in the direction of approaching the travel lane line. When the own vehicle is gradually moving towards the travel lane line, the steering torque applying unit 9 performs steering in the direction of moving away from the travel lane line.

Next, with reference to FIGS. 3 and 4, the travel lane line recognition process will be described. At step 11 in FIG. 3, the departure prevention apparatus 1 uses the in-vehicle camera 7 to acquire an image of a landscape including the road surface ahead of the own vehicle and acquires the road surface image data.

At step S12, edge points are extracted based on the road surface image data acquired at step S11. Specifically, first, the departure prevention apparatus 1 calculates a differential value using a differential filter for each horizontal line (all pixels having equal vertical coordinate values) in the road surface image data. In other words, a rate of change of luminance values between adjacent pixels is calculated for the plurality of pixels composing a horizontal line.

When the in-vehicle camera 7 is a color camera, calculation may be conducted of the rate of change of RGB signals outputted from the color camera, or color difference signals obtained by converting the RGB signals to luminance signals and color difference signals.

Then, it is determined whether or not the calculated differential value is not less than a predetermined threshold. If it is determined that the differential value is not less than the threshold, the luminance values are considered to have significantly changed between adjacent pixels. Thus, the coordinate values of the pixels are extracted as edge points and registered. The above-described process is performed for all pixels in the image.

At step S13, a white line candidate is extracted by a known linear extraction Hough transform process or the like, on the basis of the edge points extracted at step S12. A plurality of white line candidates may be detected in a single image frame. Then, a lane line is detected from the plurality of white line candidates, using known pattern matching. Furthermore, a plurality of travel lane lines are estimated from an edge of the lane line, on the basis of a known model.

At step S14, the departure prevention apparatus 1 determines a travel lane line to be used at step S15, described hereafter, from among the plurality of travel lane lines estimated at step S13.

At step S15, road parameters are estimated using any known model, on the basis of the travel lane line determined at step S14. Models that can be used include the Kaufman filter, arc regression, linear regression, clothoid regression, and the like. The model may be changed depending on the state of control. The road parameters are as follows.

Offset: In the case of alarm control, the offset refers to a distance from the front wheel of the own vehicle to a detected travel lane line. In the case of the steering process in respect of a direction for avoiding departure, the offset refers to a distance from a predicted position of the front wheel of the own vehicle after lapse of a predetermined period to a detected travel lane line.

Yaw angle: In the case of alarm control, the yaw angle refers to the angle formed between the advancing direction of the own vehicle and the longitudinal direction of the travel lane line at the position of the front wheel. In the case of the steering process in respect of a direction for avoiding departure or the parallel-driving control process, the yaw angle refers to the angle formed between the advancing direction of the own vehicle and the longitudinal direction of the travel lane line at the predicted position of the front wheel of the own vehicle after lapse of a predetermined period Curve R: In the case of alarm control, the curve R refers to the curvature of the travel lane line at the position of the front wheel of the own vehicle. In the case of the steering process in respect of a direction for avoiding departure or the parallel-driving control process, the curve R refers to the curvature of the travel lane line at the predicted position of the front wheel of the own vehicle after a predetermined amount of time Referring now to FIG. 4, the travel lane line determination process performed at step S14 will be described. At step S21 in FIG. 4, an environment condition is acquired. The environment condition, can include, for example, whether it is nighttime, whether there is a crosswalk, a sharp curve, a curve exit, a unilateral line, a blurred white line, or the like, ahead of the vehicle, whether the own vehicle is pitching, or whether the line type of the detected travel lane line is a broken line.

Whether it is nighttime, or the blurred white line, can be determined by the luminance of the image acquired by the in-vehicle camera 7 or the contrast of the image with the road surface. The crosswalk and the unilateral line can be determined by performing an image recognition process in the image acquired by the in-vehicle camera 7. Further, the sharp curve, the curve exit, the blurred white line, and the like can be determined from travel lane lines that have been detected in the past. Furthermore, the sharp curve and the curve exit can also be determined from the angle of steering Sg. Still further, as to whether the line type of the detected travel lane line is a broken line, the line type can be determined to be a broken line if the number of edge points present on the travel lane line is not more than a predetermined value.

At step 22, it is determined whether or not the environment condition acquired at step 21 is a specified environment condition set in advance. The specified environment condition corresponds to any of (i) to (iv) provided below. The specified environment condition is provided as an example in which erroneous recognition of the travel lane line tends to occur.

(i) It is nighttime.

(ii) A crosswalk, a sharp curve, a curve exit, a unilateral line, a blurred white line, or the like is present ahead of the own vehicle.

(iii) The own vehicle is pitching.

(iv) The line type of the detected travel lane line is a broken line.

If it is determined that the environment condition corresponds to the specified environment condition, control proceeds to step S23. If it is determined that the environment condition does not correspond to the specified environment condition, control proceeds to step S27.

At step S23, the departure prevention apparatus 1 acquires an execution state of the control process (departure prevention process and parallel-driving control process) (whether the process is being performed at the moment).

At step S24, the departure prevention apparatus 1 determines an exclusion condition according to the execution state of the control process acquired at step S23. The exclusion condition specifically includes (A) and (B) provided below. (A) is an exclusion condition when the departure prevention process is being performed, and (B) is an exclusion condition when the parallel-driving control process is being performed.

(A) The travel lane line is shifted inward by a predetermined threshold X2 or more from a travel lane line detected in the past or a travel lane line predicted from the travel lane line detected in the past.

(B) The travel lane line is shifted outward by a predetermined threshold X3 or more from a travel lane line detected in the past or a travel lane line predicted from the travel lane line detected in the past.

When neither of the control processes is performed, no exclusion condition is determined.

At step S25, the thresholds X2 and X3 mentioned at step S24 are set. The thresholds can be set based on the environment condition acquired at step S21. The thresholds X2 and X3 are associated with distance or angle.

At step S26, the departure prevention apparatus 1 excludes a travel lane line which corresponds to the exclusion condition determined at step S24, from among the plurality of travel lane lines estimated at step S13. For example, when it is determined that the departure prevention process is being executed at step S23, the departure prevention apparatus 1 excludes a travel lane line that is shifted inward by the predetermined threshold X2 or more from a travel lane line detected in the past or a travel lane line predicted from the travel lane line detected in the past, according to (A) mentioned at step S24.

Further, when it is determined that the parallel-driving control process is being executed at step S23, the departure prevention apparatus 1 excludes a travel lane line that is shifted outward by the predetermined threshold X3 or more from a travel lane line detected in the past or a travel lane line predicted from the travel lane line detected in the past, according to (B) mentioned at step S24.

At step S27, the departure prevention apparatus 1 determines a travel lane line on the basis of likeness to a lane, such as the luminance of the travel lane line, the pattern of the travel lane line, or the like, from among the travel lane lines that have remained after the exclusion at step S26. The travel lane line determined here is used in the process at step S3. When all the travel lane lines are excluded by the exclusion at step S26, the travel lane line determined at step S14 of the previous cycle is used.

3. Effects of the Departure Prevention Apparatus 1

(1) The departure prevention apparatus 1 determines whether or not the own vehicle is going to depart from a travel lane line. When it is determined that the own vehicle is going to depart from a travel lane line, the departure prevention apparatus 1 permits the buzzer unit 11 to issue a sound (lane departure alarm) and performs a departure prevention process. As a result, departure of the own vehicle from the travel lane line can be prevented. In addition, the departure prevention apparatus 1 can perform a parallel-driving control process to have the own vehicle traveled along the travel lane line.

(2) Let us discuss the case where, at step S13, a travel lane line 105 is detected, due to erroneous recognition or the like, on the inside of an actual travel lane line 103 that is present ahead of an own vehicle 101, as shown in FIG. 5 by (a). In this case, should the departure prevention process at step S3 be performed using the detected travel lane line 105, the own vehicle 101 is determined to have a risk of departing from the travel lane line 103, in spite of the fact that there is no such a risk of departure. Accordingly, unnecessary departure prevention process is performed.

In this regard, the departure prevention apparatus 1 can avoid the above problem by not using the travel lane line corresponding to an exclusion condition which is determined, at steps S23 to S26, according to the execution state of the departure prevention process or the parallel control process.

(3) Let us discuss the case where, at step S13, the travel lane line 105 is detected, due to erroneous recognition or the like, on the outside of the actual travel lane line 103 that is present ahead of the own vehicle 101, as shown in FIG. 5 by (b). In this case, should the parallel control process at step S3 be performed using the detected travel lane line 105, sudden steering occurs, as a result of the parallel control process being performed such that the travel lane line detected on the outside of the actual travel lane line becomes parallel to the advancing direction of the own vehicle.

In this regard, the departure prevention apparatus 1 can avoid the above problem by not using the travel lane line corresponding to an exclusion condition which is determined, at steps S23 to S26, according to the execution state of the departure prevention process or the parallel-driving control process.

(4) When the environment condition is a specified environment condition (when noise is easily caused in travel lane line detection and thus a travel lane line tends to be erroneously detected), the departure prevention apparatus 1 performs the processes at steps S23 to S26. When the environment condition is not the specified environment condition, the processes at steps S23 to S26 are skipped and then control proceeds to step S27. As a result, the process performed by the departure prevention apparatus 1 can be simplified.

Second Embodiment

Hereinafter is described a departure prevention apparatus 1 according to a second embodiment. The configuration of the departure prevention apparatus 1 according to the present embodiment and the processes performed thereby are basically similar to those according to the first embodiment. However, according to the present embodiment, when all the travel lane lines are excluded as a result of the exclusion at step 26, a process in which there is no travel lane (or, a travel lane is lost) is performed. In the case of lost, neither the sounding of the lane departure alarm, nor the parallel-driving control process (step S3) is performed.

The departure prevention apparatus 1 according to the present embodiment can also achieve effects substantially similar to those according to the first embodiment.

The present invention should not be construed as being limited in any way by the first and second embodiments. It goes without saying that, in a scope not departing from the present invention, the present invention can be implemented in various modes.

For example, according to the first and second embodiments, the processes at steps S21 and S22 may be omitted. In other words, the processes at steps S23 to S26 may be performed, without relying on the environment condition.

In addition, at step S24 according to the first and second embodiments, an object to be compared with a travel lane line may be the travel lane line that has been determined at step S14 two or more cycles before.

In addition, at step S27 according to the first embodiment, when all the travel lane lines are excluded by the exclusion at step S26, the travel lane line detected at step S14 two or more cycles before may be determined.

According to the first and second embodiments, the travel lane line determination process at step S14 may be performed for one of a pair of left and right travel lane lines. The other of the travel lane lines may be determined from the travel lane lines detected at step S13 according to predetermined criteria, without performing the above exclusion process being.

In this case, for example, of the pair of left and right travel lane lines, the travel lane line having a larger amount of shifting relative to the previously detected travel lane line can be used as one of the travel lane line.

In addition, when one of the pair of left and right travel lane lines is a broken line, the travel lane line that is the broken line easily generates noise (e.g., broken-line travel lane line) may be used as the one of the travel lane lines.

The in-vehicle camera 7 and the image recognizing unit 17 of the control unit 5 are an embodiment of the image acquiring means (or the image acquiring unit) and the environment condition detecting means (or the environment condition detecting unit). The image recognizing unit 17 is an embodiment of the edge point extracting means (or the edge point extracting unit) and the lane line detecting means (or the lane line detecting unit). The main control unit 21 is an embodiment of the travel lane line estimating means (or the travel lane line estimating unit), the travel lane line determining means (or the travel lane line determining unit), the determining means (or the determining unit), the departure preventing means (or the departure preventing unit), and the parallel-driving control means (or the parallel-driving control unit).

Of these, the image acquiring means corresponds to steps S2 and S11. The edge point extracting means corresponds to steps S2 and S12. The lane line detecting means corresponds to steps S2 and S13. The travel lane line estimating means corresponds to steps S2 and S13. The travel lane line determining means corresponds to steps S2, S14, and S21 to S27. The determining means corresponds to step S3, the departure preventing means corresponds to step S3, and the parallel-driving control means corresponds to step S3.

According to the above embodiments, the control unit 15 (the image recognizing unit 17 and the main control unit 21) functions as each of, or some of, the above means. The control unit 15 can be realized by a combination of the above hardware elements (CPU, ROM, RAM, EEPROM, DSP, etc.) and software elements (programs). The configurations of the hardware elements and the software elements are not particularly limited, and any configuration may be used as long as the control unit 15 is capable of functioning as each of, or some of, the above means. For example, a configuration may be such that a single means (process) is realized by a single program. Alternatively, a configuration may be such that an n number (n being a natural number of 2 or more) of means (processes) is realized by an n−1 or less number of programs (e.g., a single program). The number of hardware elements, such as the CPU, ROM, RAM, EEPROM, and DSP, is also not particularly limited, and may be one, or two or more as long as the control unit 15 is capable of functioning as each of, or some of, the above means.

REFERENCE SIGNS LIST

1: lane line departure prevention apparatus
3: vehicle speed sensor
5: yaw sensor
7: in-vehicle camera
9: steering torque applying unit
11: buzzer unit
13: meter display unit
15: control unit
17: image recognizing unit
19: travel trajectory calculating unit
21: main control unit
101: own vehicle
103, 105: travel lane line

What is claimed is:

1. A lane line departure prevention apparatus comprising: an image acquiring unit, using a processor, that images an image of a road surface ahead of an own vehicle and acquires a road surface image; an edge point extracting unit, using a processor, that extracts edge points from the road surface image acquired by the image acquiring unit; a lane line detecting unit, using a processor, that detects a lane line on the basis of the edge points extracted by the edge point extracting unit; a travel lane line estimating unit, using a processor, that estimates a plurality of travel lane lines from an edge of the lane line; a travel lane line determining unit, using a processor, that determines a travel lane line to be used based on a selection criterion set in advance, from the plurality of travel lane lines; a determining unit, using a processor, that determines whether or not the own vehicle is going to depart from the travel lane line on the basis of the travel lane line determined by the travel lane line determining unit; a departure preventing unit, using a processor, that outputs an alarm or controls steering of the own vehicle towards a direction in which the departure is avoided, when the determining unit determines that the own vehicle is going to depart from the travel lane line; and a parallel-driving control unit, using a processor, that controls steering of the own vehicle such that the own vehicle travels along a travel lane line determined by the travel lane line determining unit, the selection criterion determining the travel lane line from the plurality of travel lane lines which do not correspond to an exclusion condition set in advance, according to an execution state of the departure preventing unit or the parallel-driving control unit, the lane line departure prevention apparatus further comprising an environment condition detecting unit, using a processor, that detects an environment condition set in advance, the exclusion condition depending on a detection result of the environment condition detecting unit.

2. The lane line departure prevention apparatus according to claim 1, wherein
the exclusion condition is at least either of:
(A) an exclusion condition for when an operation of the departure preventing unit is being executed, in which a travel lane line is shifted inward by a predetermined threshold or more from the travel lane line detected in the past or a travel lane line predicted from the travel lane line detected in the past; and
(B) an exclusion condition for when an operation of the parallel-driving control unit is being executed, in which a travel lane line is shifted outward by a predetermined threshold or more from the travel lane line detected in the past or a travel lane line predicted from the travel lane line detected in the past.

3. The lane line departure prevention apparatus according to claim 1, wherein:
the image acquiring unit and the environment condition detecting unit are configured by an imaging unit mounted to the own vehicle and an image recognizing unit provided in a control unit mounted to the own vehicle;

the edge point extracting unit, the lane line detecting unit, and the travel lane line estimating unit are configured by the image recognizing unit; and the travel lane line determining unit, the determining unit, the departure preventing unit, and the parallel-driving control unit are configured by a main control unit provided in the control unit.

4. A lane line departure prevention method comprising: picking up, by an image acquiring unit using a processor, an image of a road surface ahead of an own vehicle and acquiring a road surface image; extracting, by an edge point extracting unit using a processor, edge points from the road surface image acquired by the image acquiring unit; detecting, a lane line detecting unit using a processor, a lane line on the basis of the edge points extracted by the edge point extracting unit; estimating, by a travel lane line estimating unit using a processor, a plurality of travel lane lines from an edge of the lane line; determining, by a travel lane line determining unit using a processor, a travel lane line to be used on the basis of a selection criterion set in advance, from among the plurality of travel lane lines; determining, by a determining unit using a processor, whether or not the own vehicle is going to depart from the travel lane line, on the basis of the travel lane line determined by the travel lane line determining unit; outputting, by a departure preventing unit using a processor, a predetermined alarm or controlling steering of the own vehicle towards a direction in which the departure is avoided, when the determining unit determines that the own vehicle is going to depart from the travel lane line; controlling, by a parallel control unit using a processor, steering of the own vehicle such that the own vehicle travels along the travel lane line determined by the travel lane line determining unit, wherein the selection criterion determines the travel lane line from the plurality of travel lane lines which do not correspond to an exclusion condition set in advance, according to an execution state of the departure preventing unit or the parallel-driving control unit, the lane line departure prevention method further comprises detecting, by an environment condition detecting unit using a processor, an environment condition set in advance, the exclusion condition depending on a detection result of the environment condition detecting unit.

5. The lane line departure prevention method according to claim 4, wherein the exclusion condition is at least either of:
(A) an exclusion condition for when an operation of the departure preventing unit is being executed, in which a travel lane line is shifted inward by a predetermined threshold or more from the travel lane line detected in the past or a travel lane line predicted from the travel lane line detected in the past; and
(B) an exclusion condition for when an operation of the parallel-driving control unit is being executed, in which a travel lane line is shifted outward by a predetermined threshold or more from the travel lane line detected in the past or a travel lane line predicted from the travel lane line detected in the past.

6. The lane line departure prevention method according to claim 4, wherein:

the image acquiring unit and the environment condition detecting unit are configured by an imaging unit mounted to the own vehicle and an image recognizing unit provided in a control unit mounted to the own vehicle;

the edge point extracting unit, the lane line detecting unit, and the travel lane line estimating unit are configured by the image recognizing unit; and the travel lane line determining unit, the determining unit, the departure preventing unit, and the parallel-driving control unit are configured by a main control unit provided in the control unit.

\* \* \* \* \*